(12) United States Patent
Hill

(10) Patent No.: US 6,203,000 B1
(45) Date of Patent: Mar. 20, 2001

(54) ESCROW STORAGE DEVICE

(75) Inventor: David Hill, Dundee (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 08/902,998

(22) Filed: Jul. 30, 1997

(30) Foreign Application Priority Data

Nov. 6, 1996 (GB) .................................... 9623046

(51) Int. Cl.$^7$ ................................... B65H 33/04
(52) U.S. Cl. ................... 270/58.11; 270/52.18; 270/58.21; 270/58.22; 209/534; 271/903; 271/536; 271/900
(58) Field of Search .................. 198/803.1, 803.13, 198/484.1, 470.1; 270/58.11, 52.18, 58.21, 58.22; 271/903, 536, 900, 613; 221/84, 85; 209/534

(56) References Cited

U.S. PATENT DOCUMENTS

| | | | |
|---|---|---|---|
| 3,915,315 | * | 10/1975 | Miller .................................. 271/903 |
| 4,027,054 | * | 5/1977 | Porod .................................... 427/79 |
| 4,031,639 | * | 6/1977 | McCabe et al. ....................... 271/68 |
| 4,390,093 | * | 6/1983 | Chard, Jr. et al. .................. 198/654 |
| 4,399,905 | * | 8/1983 | Lance et al. ......................... 198/422 |
| 4,552,351 | * | 11/1985 | Tsukamoto ............................ 271/3.1 |
| 4,602,332 | * | 7/1986 | Hirose et al. ........................ 364/408 |
| 4,754,126 | * | 6/1988 | Caldwell ............................... 235/379 |
| 4,936,564 | * | 6/1990 | Hain ........................................ 271/3 |
| 5,054,621 | * | 10/1991 | Murphy et al. ....................... 209/534 |
| 5,065,872 | * | 11/1991 | Simon .............................. 198/803.13 |
| 5,127,209 | * | 7/1992 | Hunter ............................... 198/484.1 |
| 5,213,196 | * | 5/1993 | Wolf ................................. 198/803.13 |
| 5,267,826 | * | 12/1993 | Peters ................................. 414/789.9 |
| 5,271,613 | * | 12/1993 | Hain ....................................... 271/3.1 |
| 5,324,025 | * | 6/1994 | Chadwick et al. ................ 198/803.1 |
| 5,364,658 | * | 11/1994 | Jeppesen .............................. 427/209 |
| 5,435,542 | * | 7/1995 | Van Pham et al. .................. 271/246 |
| 5,475,168 | * | 12/1995 | Leslie et al. ..................... 198/803.13 |
| 5,513,773 | * | 5/1996 | Cargill ................................. 221/231 |
| 5,522,690 | * | 6/1996 | Pickering ............................. 271/903 |
| 5,586,642 | * | 12/1996 | Hawkins ......................... 198/803.11 |
| 5,667,211 | * | 9/1997 | Reist ................................... 270/52.18 |
| 5,819,622 | * | 10/1998 | Quick .................................... 83/365 |

FOREIGN PATENT DOCUMENTS

| | | | | |
|---|---|---|---|---|
| 0163977A1 | * | 11/1985 | (EP) | .............................. B65G/15/58 |
| 0163977 | | 12/1985 | (EP) | . |
| 0604880 A2 | * | 12/1993 | (EP) | .............................. G07D/13/00 |

OTHER PUBLICATIONS

A. Yamanoi: "Automatic Teller Machine with a Single Bill Stacker", IBM Technical Disclosure Bulletin, vol. 27, No. 5, Oct. 1984 p. 3073, XP002007322.

* cited by examiner

Primary Examiner—Christopher P. Ellis
Assistant Examiner—Michael E. Butler
(74) Attorney, Agent, or Firm—Gregory A. Welte

(57) ABSTRACT

A currency note storage device (10) for an ATM (50) comprises an endless rubber belt (12) carrying a multiplicity of outwardly-projecting flaps (22), the edges of the flaps attached to the belt being contiguous; the belt (12) runs around a pair of rollers (14,16) of such diameter that as the belt runs over them, the outer edges of the flaps are spread apart to form slots; the belt also runs around a pair of guides (18,20) of such diameter that as the belt runs over them the flaps are barely spaced apart.

The number of slots is known, and therefore each slot is addressable; the processor (62) of the ATM (50) records the value of the currency note in a slot, and controls a stepper motor (66) to drive the belt (12) so that a required bank note (34) is positioned adjacent a pick device (38). The device (10) can also be used to deposit currency notes in an ATM.

12 Claims, 5 Drawing Sheets

ESCROW STORAGE DEVICE

BACKGROUND OF THE INVENTION

This invention relates to an escrow storage device, that is, a temporary store from which single sheets of paper, such as bank notes, can be retrieved. The device may be used in a financial self-service terminal, such as an Automated Teller Machine (ATM).

It is known to provide an ATM having the facility to accept bank notes, cheques, bills for payment etc., and to place them in an escrow storage area, usually a cassette, but it is not easy to re-use the deposited notes without human intervention. Usually the notes have to be sorted into bundles of identical denomination before reuse.

SUMMARY OF THE INVENTION

It is the object of the invention to provide an escrow storage device providing the facility to identify and retrieve individual bank notes and the like.

According to the invention there is provided a storage device for sheets of paper characterized by an endless belt of resilient material carrying on its outer surface a multiplicity of outwardly-projecting flaps, the edges of the flaps adjacent the belt being contiguous; support means to support the inner surface of the belt; and drive means to drive the belt around the support means; a first part of the support means being of smaller radius than other parts of the support means so that when the inner surface of the belt passes over said first part, the outer edges of the outwardly-projecting flaps are spread apart.

Preferably the storage device is provided with identification means to identify each slot between adjacent flaps, and recording means to record the identity of a paper sheet placed in an individual slot, for example the value of a bank note.

BRIEF DESCRIPTION OF THE DRAWINGS

The invention will now be described by way of example only with reference to the accompanying drawings in which.

DETAILED DESCRIPTION

Figure 1A:
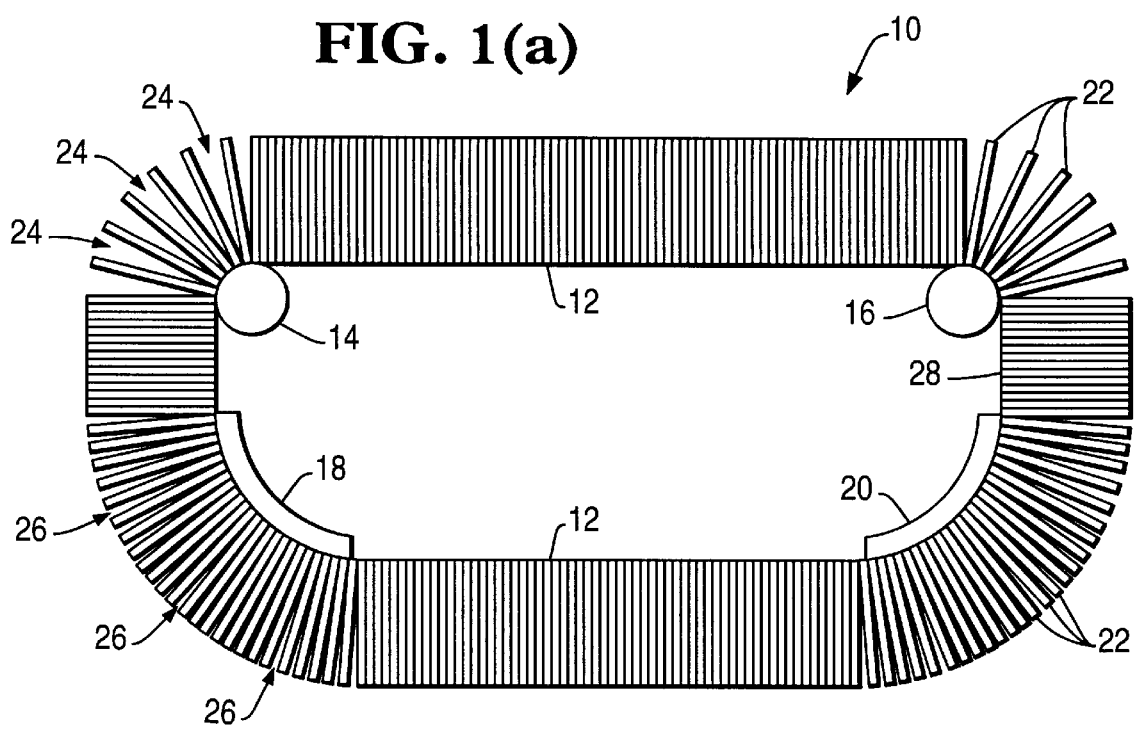
FIGS. 1(a) and 1(b) are respectively a schematic view and a schematic end view of the storage device.

In FIG. 1 a storage device 10 according to the invention comprises an endless rubber belt 12 running around a pair of relatively small diameter rollers 14,16 and a pair of relatively large diameter steel guides 18,20. On the outer surface of the rubber belt are a multiplicity of outwardly projecting rectangular flaps 22. One edge of each flap is attached to the belt 12 and the number of flaps and their thickness is selected so that, at the attached edges, the flaps are contiguous.

As the belt passes over the rollers 14,16, the edges of the flaps remote from the belt are spaced apart; the term "relatively small diameter" is used to indicate a substantial spreading of the flaps, to provide tapered slots 24 into which individual sheets, e.g. paper sheets or bank notes, can be inserted. As the belt passes over the steel guides 18,20, slight spreading of the flaps occurs; the term "relatively large diameter" is used to indicate a slight spreading of the flaps, as shown at 26, which is sufficiently small for any sheet between the flaps to be retained, whatever the orientation.

Between the rollers 14,16 and between the guides 18,20 the flaps 22 are essentially close-packed and parallel, and close packing also occurs between roller 14 and guide 18, and between roller 16 and guide 20, as illustrated at 28. The end view FIG. 1(b) shows the tapered slots 24, close packed area 28, and the slight spreading 26.

Figure 1B:
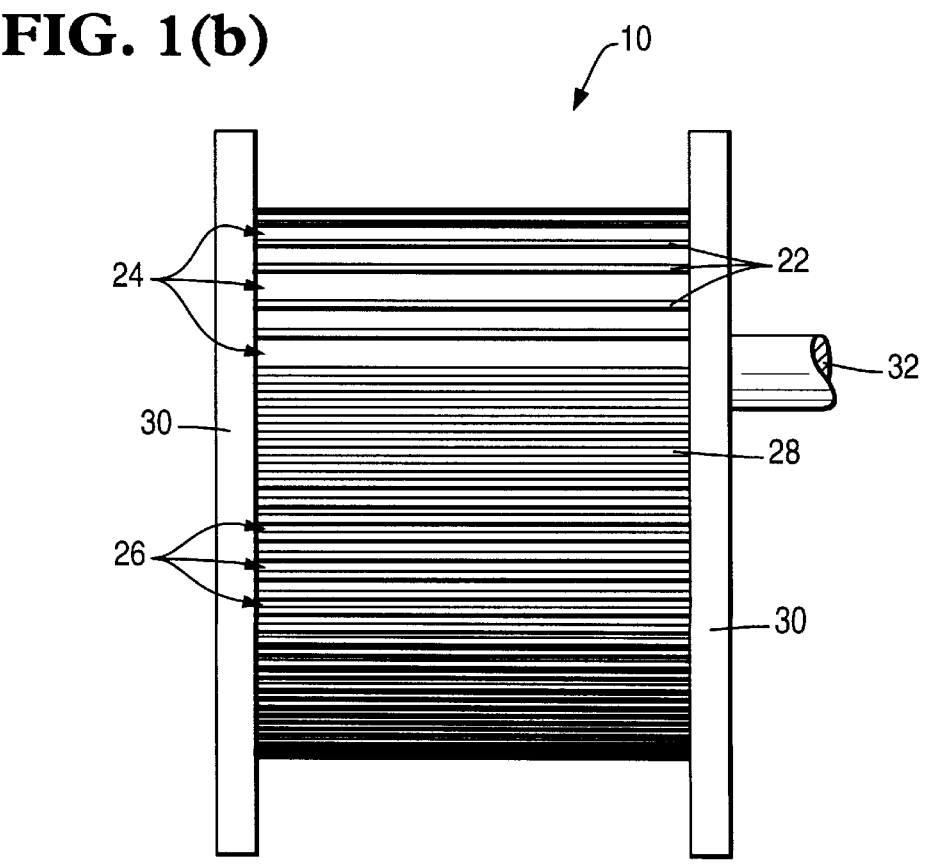

FIG. 1(b) also shows a pair of spaced guides 30 between which the flaps 22 are positioned, and a drive shaft 32 attached to the roller 16.

The spreading of the flaps 22 to form tapered slots 24 is assisted by the resilience of the rubber of the belt 12; the outer surface of the belt stretches slightly as it passes over the smaller diameter rollers 14,16.

Figure 2:
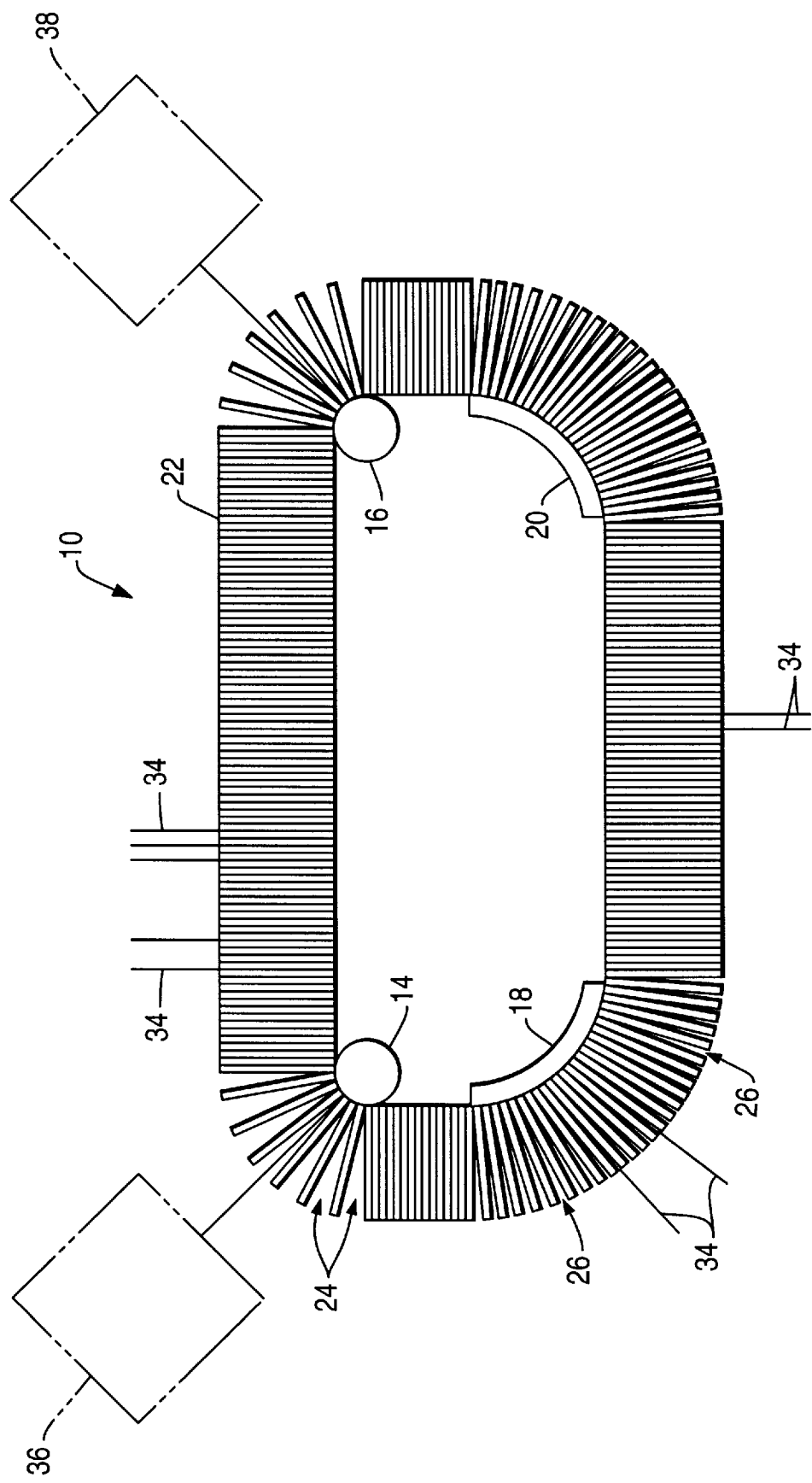
FIG. 2 illustrates a storage device in operation.

In FIG. 2, the storage device 10 is shown in operation with a number of bank notes 34 held between the flaps 22. The device is arranged with the rollers 14,16 horizontal, and the guides 18,20 spaced below the rollers. In the horizontal sections of the belt 12 between the rollers 14,16 and between the guides 18,20, the flaps 22 are tightly packed and the notes 34 are held firmly, even when held upside down between the guides 18 and 20. As the belt passes around the guides 18,20 the flaps spread slightly but the bank notes are still held in position.

As the belt passes over the roller 14, a bank note can be inserted into each slot 24 by an insertion device 36 shown schematically. As the belt passes over the roller 16, bank notes can be retrieved by a pick device 38 shown schematically.

Figure 3A:
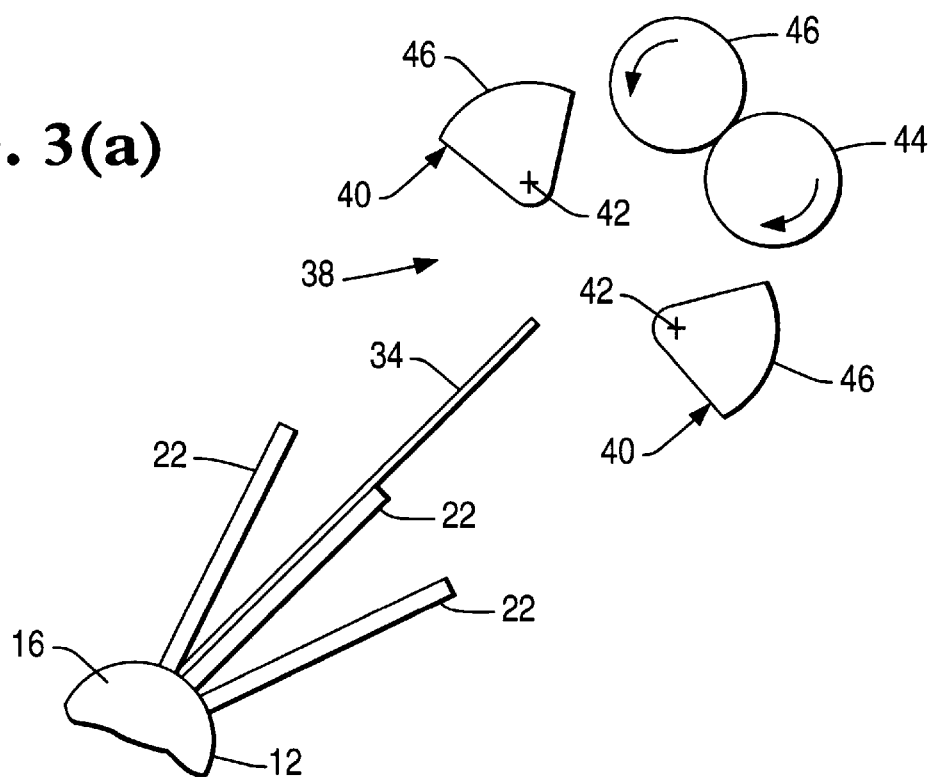
FIG. 3 illustrates a pick device for the storage device.

One example of the pick device 38 suitable for use with a storage device 10 is shown in FIG. 3. In FIG. 3(a), a bank note 34 is shown supported by a flap 22 as it passes over the roller 16. Adjacent the projecting end of the note 34 is a pair of wedge-shaped rotary grippers 40 each pivoted about a pivot point 42, positioned toward the narrow end of the respective wedge. The wedges are rotatable by first drive means (not shown). The thick end of each wedge has a convex surface 46, and the pivots 42 are spaced so that, at the point of rotation where the convex surfaces 46 are adjacent, they are just in contact.

On the opposite side of the grippers 40 to the bank note 34 is a pair of rollers 44 rotatable about their central axes by drive means (not shown).

Figure 3B:
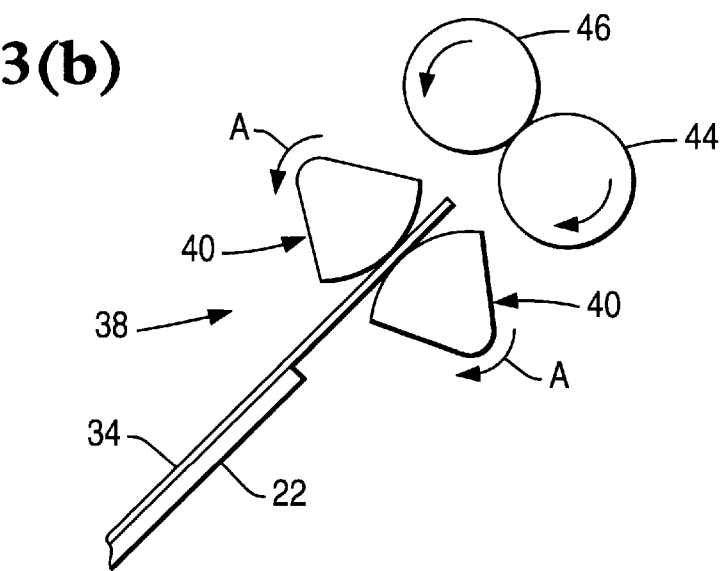

When the note 34 is to be picked by the pick device 38, the grippers 40 are rotated in opposite directions, as indicated by the arrows A in FIG. 3(b), so that their convex surfaces 46 contact opposite surfaces of the note 34, and draw it away from the flap 22 towards the rollers 34, which receive the note.

To place a bank note in position on a flap 22, the mechanism may be operated in reverse.

Figure 4:
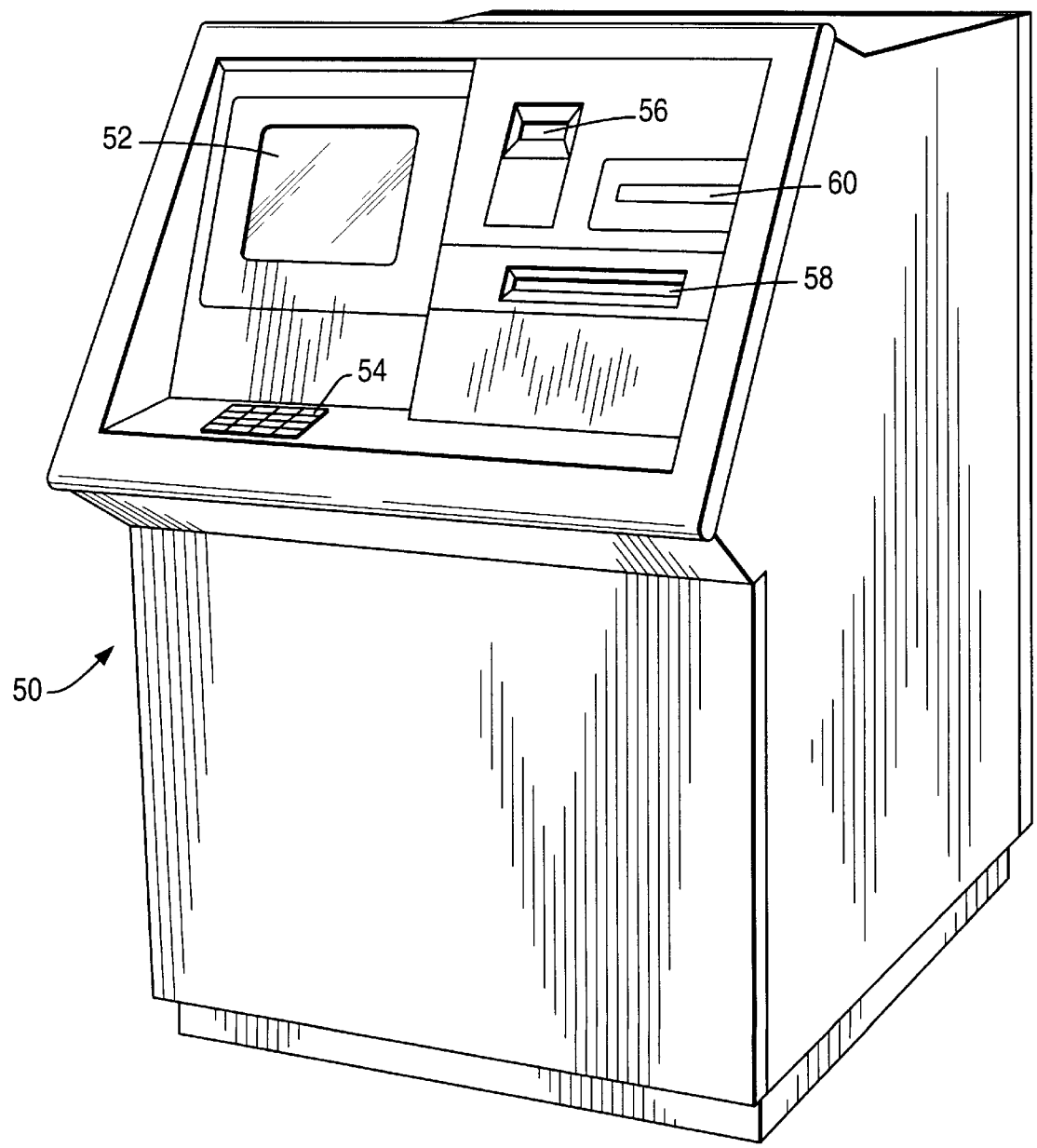
FIG. 4 illustrates an ATM incorporating the storage device.

The storage device according to the invention may be used in a financial self-service terminal such as an ATM 50 shown in FIG. 4. The ATM has a display screen 52, key pad 54, user card insertion slot 56, cash delivery slot 58, and cash deposit slot 60.

In an ATM, it is essential to deliver the correct sum of money requested by the user, and the storage device according to the invention allows a single device to store and permit accurate retrieval of mixed denomination notes. Since the number of slots on the device 10 is known, i.e. the spaces between the flaps 22, each slot can be regarded as addressable; bank notes of known denomination can be delivered to a known address, and therefore a sum made up of mixed denomination notes can be retrieved by driving the belt by a stepper motor so that slots containing notes of the required denomination are stopped adjacent the pick device 38.

Figure 5:
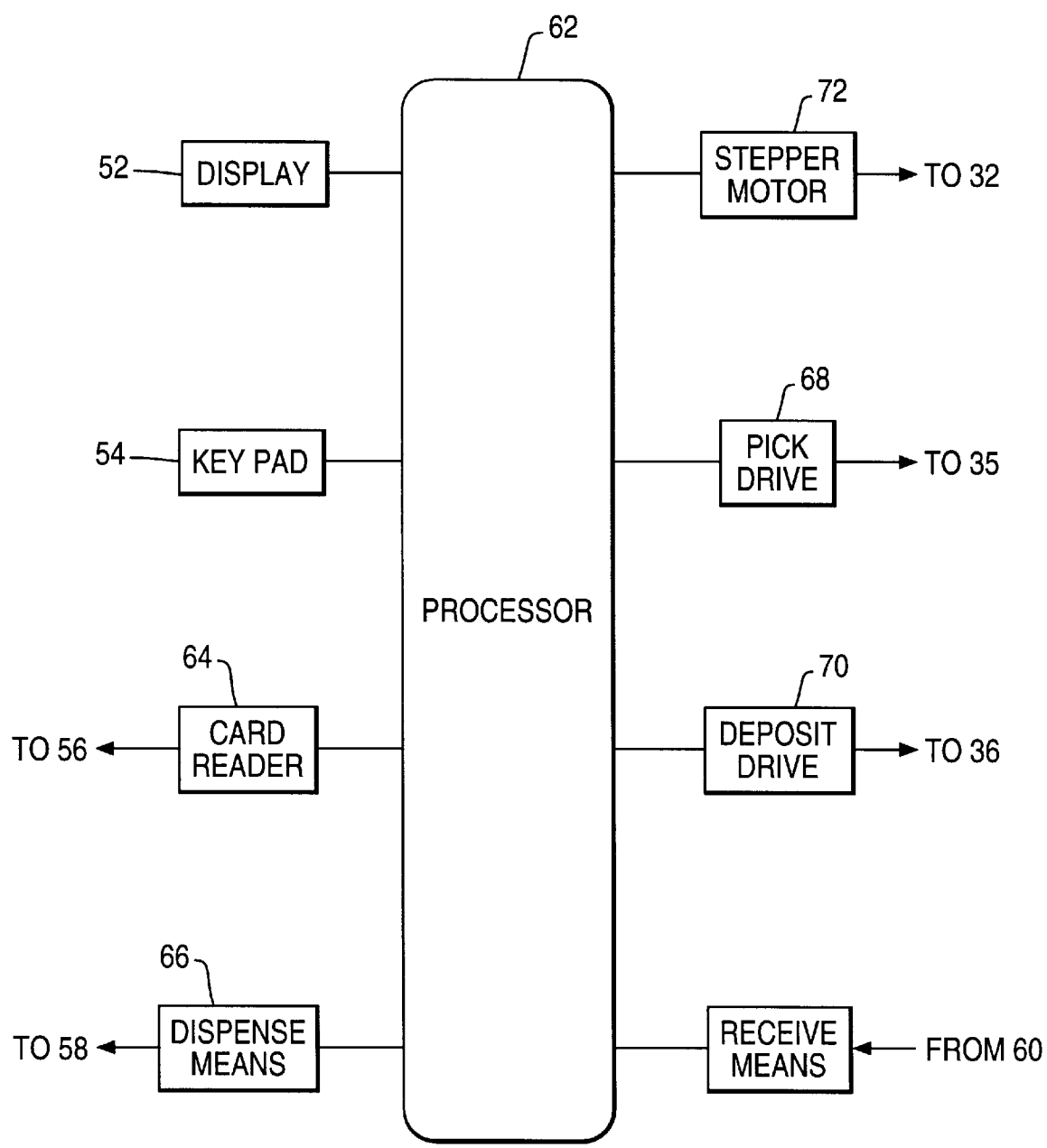
FIG. 5 illustrates a control system for the ATM of FIG. 4.

A control system for the ATM 50 allowing such a facility is shown in FIG. 5. A processor 62 within the ATM 50 controls the display means 52, key pad 54, a card reader 64 connected to card input slot 56, and to a dispense means 66 connected to the cash dispense slot 58, all of which are conventionally provided.

The processor 62 also controls a stepper motor 66 connected to the drive shaft 32 of the storage device 10 (see FIG. 1), to a pick drive 68 connected to the pick device 38, and to a deposit drive 70 connected to the insertion device 36.

As the slots of the storage device 10 are loaded with bank notes by the insertion device 36, the processor 62 retains in its memory a record of the value of the bank note in each addressable slot of the device 10. When a user of the ATM requests the withdrawal of a sum of money, the processor selects the slot nearest to the pick means 38 having the required notes, and drives the stepper motor 72 so that the storage device 10 stops with each required note in turn adjacent the pick device 38, which picks the notes and delivers them to the dispense slot 58 by known arrangements.

For an ATM with a cash deposit facility 60, deposited notes can be sorted, validated, and inspected for reusable quality by conventional means. The reusable notes are supplied to the insertion device 36, which inserts a single note into each available addressable slot of the storage device 10; the processor 62 records the address and the value of each inserted note, so that the notes can then be reused.

What is claimed is:

1. An apparatus for storing paper sheets, the apparatus comprising:
   an endless belt of resilient material having inner and outer surfaces;
   a plurality of outwardly projecting flaps disposed on the outer surface of the belt, each flap having an inner edge and an outer edge;
   the inner edges of the flaps being adjacent the outer surface of the belt and the inner edge of each flap is contiguous with the inner edge of each adjacent flap, and the flaps preventing paper sheets captured between adjacent flaps from falling out by contact with the sheets, whether the flaps point upward or downward; and
   support means for supporting the inner surface of the belt to support movement of the belt, the support means comprising an upper support supporting the inner surface of the belt above and a lower support supporting the inner surface of the belt below, the lower support having a radius sufficiently large so as to maintain the flap inner edges in contact with each other while the flaps traverse about the lower support, the upper support having a smaller radius than the lower support of the support means such that the outer edges of the outwardly projecting flaps spread apart as the inner surface of the belt passes over the upper support of the support means.

2. An apparatus according to claim 1, wherein the upper support of the support means comprises a pair of rollers each of relatively small radius.

3. An apparatus according to claim 2, wherein the upper support of the support means comprises a pair of curved guides each of relatively large radius.

4. An apparatus according to claim 1, wherein the belt comprises rubber material.

5. Apparatus comprising:
   a self-service terminal;
   a bank note storage device including
      (i) an endless belt of resilient material having inner and outer surfaces,
      (ii) a plurality of outwardly projecting flaps disposed on the outer surface of the belt, each flap having an inner edge and an outer edge, the inner edges of the flaps being
         A) adjacent the outer surface of the belt, and
         B) contiguous with each other, and
      (iii) support means for supporting the inner surface of the belt to support movement of the belt, the support means comprising a first portion having a radius and a second portion having a smaller radius such that the outer edges of the outwardly projecting flaps spread apart as the inner surface of the belt passes over the smaller first radius portion of the support means;
   a picking device adjacent the outer edges of the flaps and located in the vicinity of the smaller radius portion of the support means such that the picker device can pick a paper sheet from a slot between adjacent flaps when the flaps spread apart as the inner surface of the belt passes over the smaller radius portion; and
   an inserter device adjacent the outer edges of the flaps and located in the vicinity of the smaller radius portion of the support means such that the inserter device can insert a paper sheet from a slot between adjacent flaps when the flaps spread apart as the inner surface of the belt passes over the smaller radius portion.

6. A self-service terminal according to claim 5, further comprising a processing unit for (i) identifying each slot between adjacent flaps and (ii) recording the identity of a paper sheet which has been inserted by the inserter device into a particular identified slot.

7. A self-service terminal according to claim 5, wherein the smaller first radius portion of the support means comprises a pair of rollers.

8. A self-service terminal according to claim 7, wherein the second portions of the support means comprise a pair of curved guides each of relatively large radius.

9. A self-service terminal according to claim 5, wherein the belt comprises rubber material.

10. Apparatus according to claim 5, wherein adjacent flaps comprise a flap means for holding a paper sheet in position, even when the flap means is upside down.

11. Apparatus according to claim 5, wherein adjacent flaps comprise a flap means for holding a taper sheet in position, even when the adjacent flaps are spread when the belt passes over said smaller first radius portion.

12. Apparatus according to claim 10, wherein adjacent flaps comprise a flap means for holding a paper sheet in position, even when the adjacent flaps are spread when the belt passes over said smaller first radius portion.

* * * * *

UNITED STATES PATENT AND TRADEMARK OFFICE
CERTIFICATE OF CORRECTION

PATENT NO.     : 6,203,000 B1
DATED          : March 20, 2001
INVENTOR(S)    : David Hill It is certified that error appears in the above-identified patent and that said Letters Patent is hereby corrected as shown below:

<u>Column 4,</u>
Line 57, after "a", second occurrence, delete "taper" and insert -- paper --

Signed and Sealed this

Twenty-sixth Day of March, 2002

Attest:

JAMES E. ROGAN
*Attesting Officer*        *Director of the United States Patent and Trademark Office*